J. G. ROBINSON.
CROSS TIE FOR RAILROAD TRACKS.
APPLICATION FILED OCT. 29, 1909.
994,034.
Patented May 30, 1911.
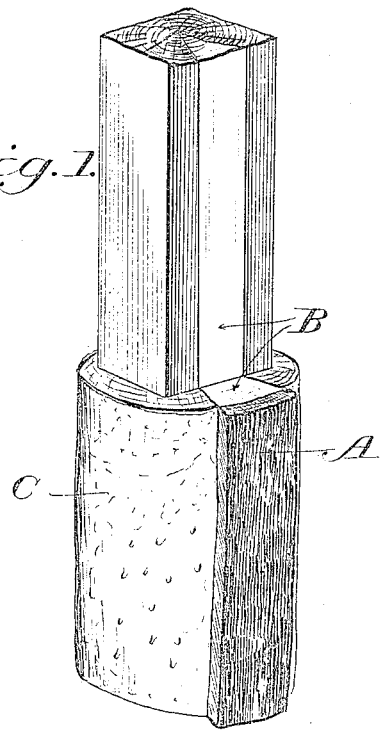
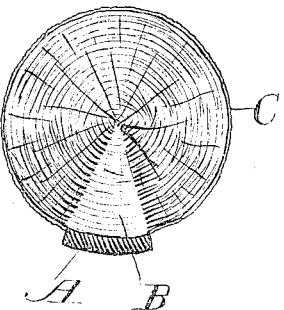
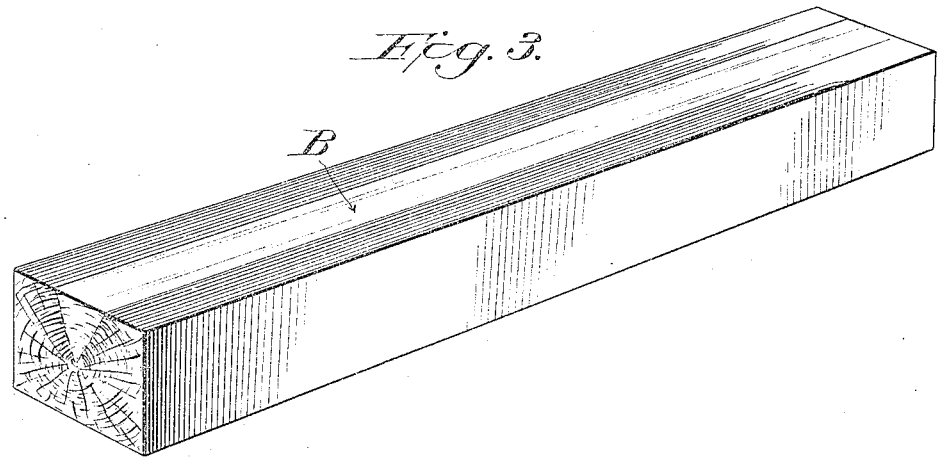
Witnesses
C. N. Walker
Jerry Metzger
Inventor
Julius Gustav Robinson
By Victor H. Wallace
Attorney

UNITED STATES PATENT OFFICE.

JULIUS GURDON ROBINSON, OF BROOKLYN, ALABAMA, ASSIGNOR OF ONE-THIRD TO ROBERT F. CROOM, EXECUTOR OF GEORGE R. FARNHAM, DECEASED, AND ONE-THIRD TO FRANK A. STRANGE, BOTH OF BROOKLYN, ALABAMA.

CROSS-TIE FOR RAILROAD-TRACKS.

994,034. Specification of Letters Patent. Patented May 30, 1911.

Application filed October 29, 1909. Serial No. 525,038.

*To all whom it may concern:*

Be it known that I, JULIUS GURDON ROBINSON, a citizen of the United States, residing at Brooklyn, in the county of Conecuh and State of Alabama, have invented a new and useful Improvement in Cross-Ties for Railroad-Tracks, of which the following is a specification.

The invention relates to certain new and useful improvements in cross ties and in the method employed in treating the growing timber from which such cross ties are made whereby a cross tie is produced which will resist decay and be exempt from destruction by insects, birds or animals.

The invention also relates to the production of a cross tie which has upon one side a longitudinal strip of wood which has not been affected by the treatment to which the growing wood has been subjected, and is consequently softer than other portions of the cross tie and to which therefore the railroad rails may be readily nailed spiked or otherwise fastened.

The invention is illustrated in the accompanying drawing, in which—

Figure 1 represents a portion of the trunk of a pine tree, showing the treatment to which it is subjected. Fig. 2 represents a transverse section of such a tree. Fig. 3 is a perspective view of a cross tie manufactured from such a tree.

Cross ties of the character covered by this invention are produced in the following manner. A growing pine tree of any variety and of suitable size is first selected. Without felling the tree, its bark is removed from the ground upward, with the exception of a narrow strip of bark which is permitted to remain, and which extends vertically up one side of the tree as may be desired. This strip of bark permits the sap to pass from the roots to the branches of the tree, and thus preserves its life. After being thus treated the tree is allowed to stand for a sufficient time to permit it to undergo the change required to produce the desired result. When a pine tree is treated in this manner, it will throw out a great quantity of pitch, in an effort to cure the wound caused by the removing of the bark. This pitch will thoroughly permeate the entire body of the tree except the narrow strip covered with bark, and a coating of hard pitch will be deposited on the outer surface of the tree as shown at C Fig. 2. The tree is then left standing for a sufficient time to permit it to become thoroughly permeated with pitch. It is then ready for use in making ties. The narrow strip of wood B, however, which has been protected by the bark A and in consequence has not been saturated with pitch will be far softer than the surrounding portions of the cross tie and to this part B nails or spikes may be readily driven.

A cross tie prepared in the manner described by reason of being thoroughly saturated with pitch will resist the action of moisture or the attack of insects, birds or animals and will far outlast cross ties made from ordinary wood.

Having fully described my invention, what I claim and desire to secure by Letters Patent is—

As an improved article of manufacture, a cross tie of pine timber having three of its sides saturated with pitch by means of partially stripping the bark from the growing tree and permitting the living wood to absorb the natural pitch prior to the manufacture of the cross tie, substantially as herein described.

In testimony whereof I have signed my name to this specification in the presence of two subscribing witnesses.

JULIUS GURDON ROBINSON.

Witnesses:
S. P. DUNN,
J. F. IRWIN.